March 12, 1946. H. A. PACEVITZ 2,396,600
RECOVERY PROCESS
Filed May 5, 1943
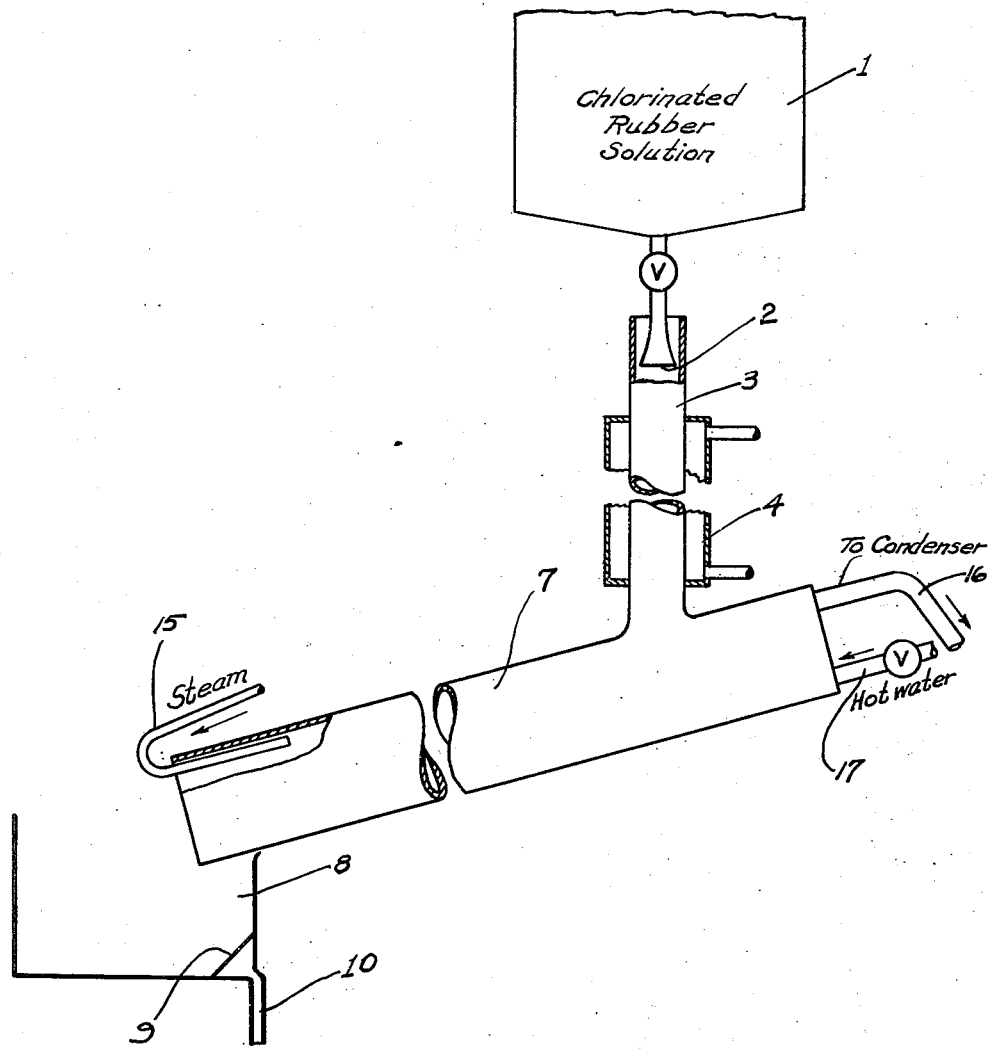
Inventor.
Henry A. Pacevitz Patented Mar. 12, 1946

2,396,600

UNITED STATES PATENT OFFICE 2,396,600

RECOVERY PROCESS

Henry A. Pacevitz, Akron, Ohio, now by judicial change of name Henry Alexander Pace, assignor to Wingfoot Corporation, Akron, Ohio, a corporation of Delaware Application May 5, 1943, Serial No. 485,736

1 Claim. (Cl. 260—772)

This invention relates to a recovery process for obtaining chlorinated rubber in solid form. It involves the rapid evaporation of solvent from a solution of the chlorinated rubber.

The process of Orthner et al. U. S. 2,094,408 involves dropping or spraying a solution of chlorinated rubber into a stream of water which is hot enough to quickly evaporate the solvent and cause the chlorinated rubber to be deposited as a solid. The water and vapors of the solvent, etc., are carried along together into a separating vessel from which the vapors are drawn off to a condenser, and then the chlorinated rubber is separated from the water.

According to this invention, also, the solvent of a chlorinated rubber solution is rapidly vaporized by dropping or spraying the solution into a stream of water which is hot enough to quickly evaporate the solvent, but the vapors thus evolved are separated from the stream of water carrying the solid chlorinated rubber and are flushed from the apparatus by a countercurrent of steam.

The process will be further described in connection with the accompanying drawing which shows, more or less diagrammatically, an apparatus which may be employed for carrying out the invention.

The solution of chlorinated rubber is fed from a storage tank 1 through a spray device 2, which may merely be a sieve opening which breaks the chlorinated rubber solution up into many small droplets. A mechanical spray device may be employed if preferred. These droplets fall through the tower 3. The water jacket 4 keeps this tower cold and prevents hot steam from entering the tower and liberating solvent at the spray device, which would cause clogging of the spray by solid chlorinated rubber thus thrown out of solution. A low-boiling solvent is used which generally has a boiling point not substantially higher than 80° C. Carbon tetrachloride is usually employed.

The droplets are caught in the pipe 7, which is inclined toward the receiver 8 and is continually flushed out with hot water and a countercurrent of steam. To simplify the illustration, the receiver 8 is shown as a vessel equipped with a sieve 9, which holds back the solid chlorinated rubber while the water is run off through the drain 10. In commercial operations the hot water would advantageously be recirculated and the stationary screens replaced by a moving-belt screen upon which the chlorinated rubber would fall and pass through washers and driers.

In the pipe 7 there is a current of steam and vapors running countercurrent to the stream of hot water. The steam is introduced through the pipe 15. It is exhausted through the pipe 16. The hot water is introduced through the pipe 17. It supplies heat for vaporization of the solvent from the chlorinated rubber solution and rapidly conveys its heat to the solvent to effect this vaporization, and also flushes the solid chlorinated rubber out of the pipe and into the receiver 8.

The chlorinated rubber solution may, for example, be a 15 per cent solution of chlorinated rubber in carbon tetrachloride. The concentration of the solution may vary over a rather wide range, depending upon the viscosity of the chlorinated rubber. Low-viscosity chlorinated rubber may be used in much higher concentrations than high-viscosity chlorinated rubber.

As the solution is sprayed down through the column 3 from the spray device 2, it passes through a blanket of steam and carbon tetrachloride vapors which fill the upper part of the pipe 7 and lower part of the column 3. These hot vapors cause some evaporation of the solvent from the droplets of the solution. The droplets are then caught in the stream of hot water which is flushed through the bottom of the pipe 7. The water is heated to just below the boiling point. As the droplets are caught in this hot water, the balance of the solvent is immediately vaporized. This causes the chlorinated rubber to puff up. The solvent which is thus separated from the chlorinated rubber mixes with the steam and is exhausted through the pipe 16 to a condenser and suitable receiver.

The stream of hot water flowing through the bottom of the pipe 7 flushes the chlorinated rubber out of the pipe. It is caught in the receiver 8 and there separated from the water. The water may be recirculated through the pipe 7. It may be desirable to wash the chlorinated rubber with fresh hot water before drying. This would remove the last traces of solvent and salts. Any suitable means may be provided for drying the product.

What I claim is:

A process for recovering chlorinated rubber from solution which comprises dropping or spraying droplets of the solution through a layer of steam onto the surface of a layer of water so hot that it rapidly separates the solvent from the chlorinated rubber, said layers of steam and water moving in countercurrent relation, and carrying the solid chlorinated rubber from the point of liberation in one direction with the layer of water and carrying the vaporized solvent in the opposite direction with the layer of steam.

HENRY A. PACEVITZ.